United States Patent [19]

Kamimura

[11] Patent Number: 5,080,554
[45] Date of Patent: Jan. 14, 1992

[54] WINDSCREEN WASHER PUMP FOR VEHICLE

[75] Inventor: Takeshi Kamimura, Hamamatsu, Japan

[73] Assignee: ASMO Co., Ltd., Japan

[21] Appl. No.: 557,799

[22] Filed: Jul. 26, 1990

[30] Foreign Application Priority Data

Jul. 31, 1989 [JP] Japan ................. 1-90036[U]

[51] Int. Cl.⁵ ................................ F01D 1/12
[52] U.S. Cl. ................. 415/55.6; 415/55.1; 416/223 B
[58] Field of Search ........ 415/55.1, 55.5, 55.6, 415/171.1, 143; 416/223 B

[56] References Cited

U.S. PATENT DOCUMENTS

| | | | |
|---|---|---|---|
| 1,652,659 | 12/1927 | Brady, Jr. | 415/55.5 |
| 2,982,986 | 5/1961 | Tupper | 415/55.6 |
| 4,408,952 | 10/1983 | Schweinfurter | 415/55.6 |
| 4,678,395 | 7/1987 | Schweinfurter | 415/55.6 |
| 5,020,969 | 6/1991 | Mase et al. | 415/55.1 |

FOREIGN PATENT DOCUMENTS

| | | | |
|---|---|---|---|
| 375042 | 5/1923 | Fed. Rep. of Germany | 416/223 B |
| 3303460 | 8/1984 | Fed. Rep. of Germany | 415/53 R |
| 3823726 | 1/1990 | Fed. Rep. of Germany | |
| 2462594 | 2/1981 | France | |
| 0138297 | 7/1985 | Japan | 415/55.2 |
| 2134598 | 8/1984 | United Kingdom | |

Primary Examiner—Edward K. Look
Assistant Examiner—Thomas Denion
Attorney, Agent, or Firm—Venable, Baetjer and Howard

[57] ABSTRACT

Disclosed herein is a windscreen washer pump, which is suitable for use with a vehicle, of a type wherein washer fluid is forcibly pressurized by means of an impeller, to be supplied to a vehicle windscreen or the like. A plurality of supplemental vanes are provided between the impeller and an inlet for entry of the washer fluid. The plurality of supplemental vanes serve to introduce the washer fluid from the inlet into the impeller and forcibly pressurize the fluid from the impeller even in a case where air is mixed.

17 Claims, 6 Drawing Sheets

WINDSCREEN WASHER PUMP FOR VEHICLE

BACKGROUND OF THE INVENTION

1. Field of the Invention

The present invention relates to a windscreen washer pump, and particularly to a single outlet-type washer pump for use with a vehicle, which serves to supply washer fluid to the windscreen.

2. Description of the Related Art

One type of washer fluid washer pump heretofore used for vehicles is a Westco rotary pump. With this type of pump, washer fluid can be supplied to, for example, a front glass, rear glass or the like at full pressure because washer fluid within a pump chamber can be fully pressurized for spraying it from an outlet.

FIGS. 7 and 8 show a conventional Westco rotary washer pump.

This pump has a pump chamber 24 with a flow channel 30 defined along the outer periphery thereof, and an rotatable impeller 22 within the pump chamber 24. When the impeller 22 is rotated and driven in a direction indicated by the arrow of FIG. 7, the washer fluid supplied from an inlet 14 is fully pressurized within the flow channel 30 and expelled from an outlet 16.

As shown in FIG. 8, the outlet 16 of the washer pump is guided to various spray nozzles 52, 54 provided at the front of the vehicle via piping—including, for example, hoses 50, a three-way joint 60, etc. The illustrated nozzles 52, 54 spray the front windscreen with washer fluid. To reduce the time required from the driving of the pump to the fluid spraying from each nozzle, check valves 56, 58 are provided at intermediate points of the piping arrangement.

In such a washer system, when the washer switch is operated by the user, the pump is driven and the washer fluid within a tank is sprayed through the front nozzles 52, 54 by means of the pump. On the other hand, when the washer fluid within the tank is depleted and the pump runs in an empty state, the hoses 50 in the piping arrangement fills with air.

At this point the user must refill the washer tank before using the washer system.

The conventional washer system is however accompanied by the problem that the fluid does not enter the pump chamber 24 because of the residual air in the hoses 50 and therefore fails to self-prime and become functional again, even when the impeller 22 provided within the pump is rotated and driven.

In particular, in the above-described washer system, it is hard to remove or expel air which exists within the piping arrangement, especially air within the hoses 50 and the pump chamber 24 because of check valves 56, 58 within the piping arrangement. Accordingly, ordinary users cannot easily solve the problem.

SUMMARY OF THE INVENTION

With the foregoing problem in view, it is therefore an object of the present invention to provide a washer pump for use with a vehicle, which can successively supply washer fluid, even after the tank has run dry and been refilled, without the problem of air in the piping.

In the present invention, a plurality of supplemental vanes are provided as well as provision of an impeller designed to forcibly feed with pressure the washer fluid by vortical flow. The supplemental vanes are provided on the upstream side of the impeller and serve to pressurize air and washer fluid with the air included therein so as to deliver the same to the impeller provided within the pump chamber.

Accordingly, even when air is included in the pump chamber, the air or the mixture of the air and the washer fluid is forcibly introduced into the impeller, thereby ensuring that the impeller is selfpriming.

An air vent for expelling air is preferably provided between the pump chamber and the inlet. In doing so, the air is discharged from the pump chamber by means of the supplemental vanes, so that the washer fluid is fed into the pump chamber.

The above and other objects, features and advantages of the present invention will become apparent from the following description and the appended claims, taken in conjunction with the accompanying drawings in which a preferred embodiment of the present invention is illustrated in the following example.

DETAILED DESCRIPTION OF THE PREFERRED EMBODIMENTS

A preferred embodiment of the present invention will now be described in detail with reference to the accompanying drawings.

Figure 2:
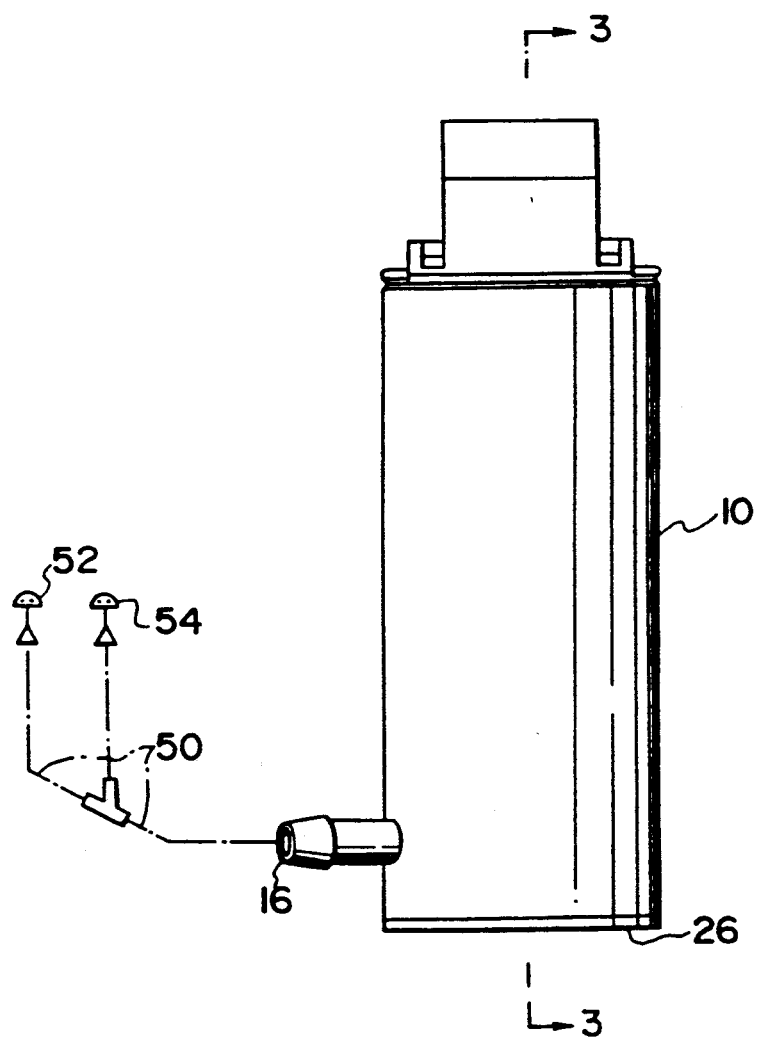
FIG. 2 is a side view showing a pump according to an embodiment of the present invention.
Figure 3:
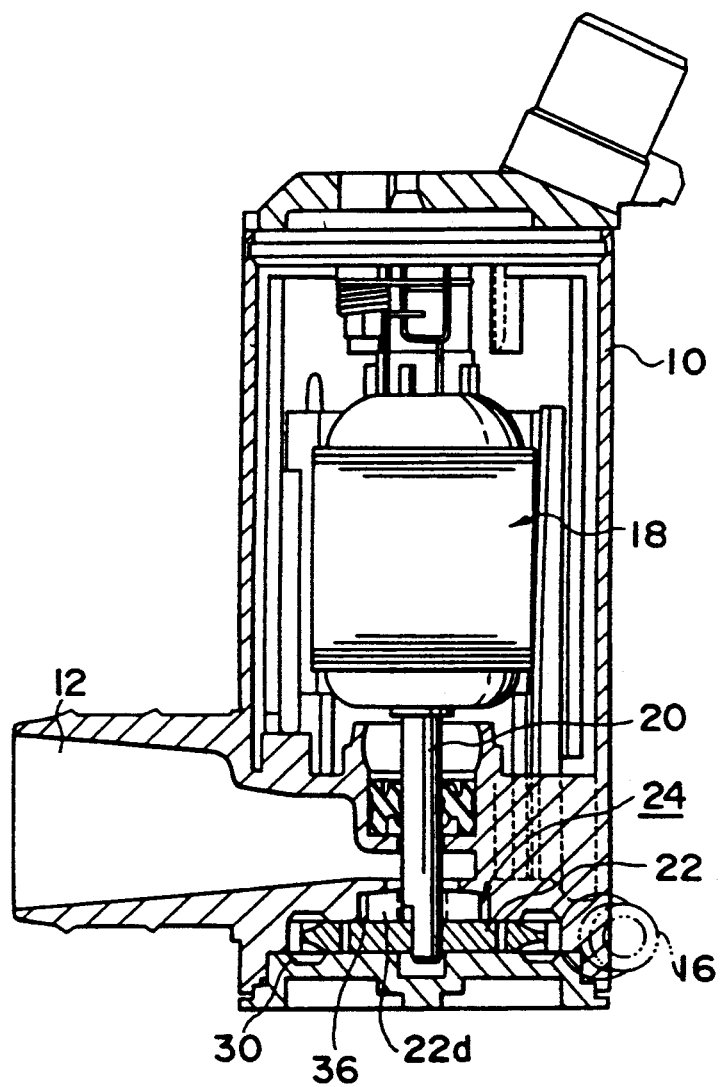
FIG. 3 is a cross-sectional view depicting the pump of FIG. 2 according to an embodiment of the present invention.

FIG. 2 illustrates the complete exterior of a washer fluid washer pump for a vehicle, to which the present invention is applied. FIG. 3 shows a sectional schematic illustration taken along line 3—3 of FIG. 2.

The washer pump employed in the present embodiment is formed with an opening for fluid intake, i.e., an intake hole 12 shown in an open state and connected to an unillustrated washer fluid supply tank, at the center of a side wall of a housing 10 formed in a substantially cylindrical fashion. In addition, the washer pump is also provided with an outlet 16 connected to nozzles 52, 54 via an arrangement of piping including, for example, hoses 50, etc., at the lower part of the side wall thereof.

As shown in FIG. 3, a rotor of a motor 18 is contained in the upper part of the housing 10, while a pump chamber 24 accommodating an impeller 22 is formed in the lower part thereof. In addition, the distal end of a rotary shaft of the motor 18 is attached to the central portion of the impeller 22. Washer fluid, which is to be supplied to the pump chamber 24 from an unillustrated tank via the inlet 12, is discharged from the outlet 16 at given pressure.

Figure 4:
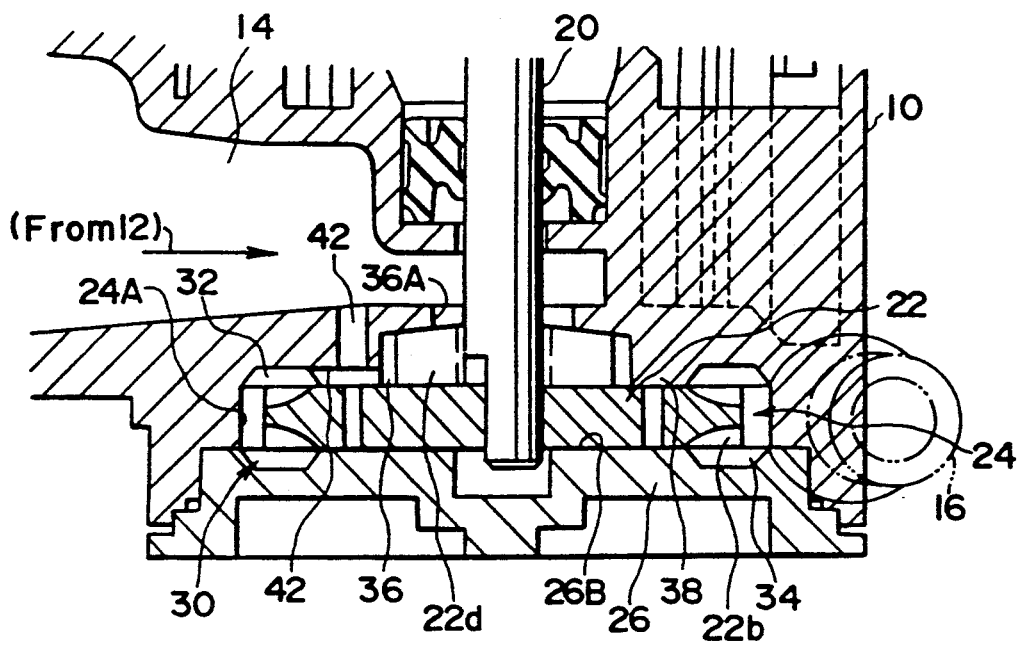
FIG. 4 is an enlarged cross-sectional view showing part of the pump shown in FIG. 3.

FIG. 4 shows an enlarged cross-sectional view of the pump chamber 24 used for the washer pump.

The pump chamber 24 employed in the present embodiment is formed between the housing 10 and a cap 26 by welding the cap 26 onto the bottom of the housing 10 defining an upper half portion of the pump chamber 24 which contains the impeller 22. The impeller 22 is housed within a circular groove 24A formed in the bottom of the housing 10 and the circular groove 24A is then closed by means of the cap 26, whereby the principal part of the pump chamber 24 is formed.

Figure 5:
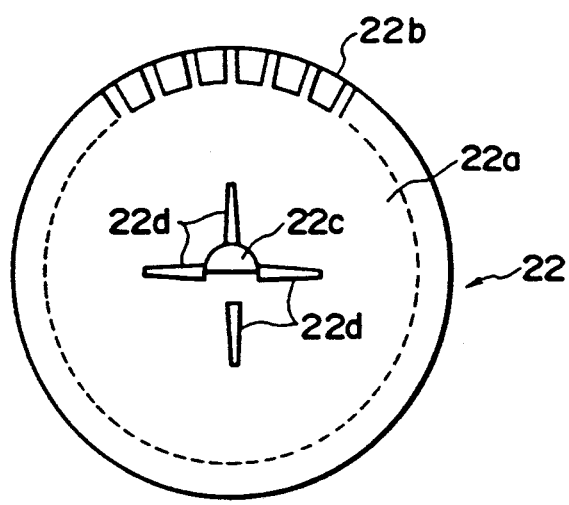
FIG. 5 is a plan view depicting an impeller.

As shown in FIG. 5, the impeller 22 is formed with a hole 22c, which is brought into engagement with the rotary shaft 20 of the motor, in the center of a circular disc 22a. In addition, a plurality of grooves 22b are formed in the impeller 22 at regular intervals along the outer periphery. These grooves 22b are formed in the front and reverse sides of the impeller 22 so as to partially reduce the thickness of the impeller 22. Furthermore, the impeller 22 according to the present invention is formed with supplemental vanes 22d providing forcible fluid movement at a position adjacent to the central portion of the impeller 22. In the illustrated embodiment, four supplemental vanes in total are provided in a substantially symmetrical form and in a radial direction of the impeller 22 with the engagement hole 22c interposed therebetween.

FIG. 1 shows an exploded view of the pump chamber portion shown in FIG. 4. In the same drawing, FIG. 1(A) depicts a housing portion formed with the upper half part of the pump chamber 24. FIG. 1(B) is a bottom view of the top face 28 of the pump chamber 24. FIG. 1(C) is a cross-sectional view taken along the shaft center of the impeller. FIG. 1(D) is a cross-sectional view showing the structure which is principally located adjacent to the top of the cap 26.

As shown in the same drawing, a flow channel 30 through which washer fluid flows along the outer periphery of the circular groove 24A is formed within the pump chamber 24. The flow channel 30 employed in the present embodiment is a concave groove 32, whose length is in the form of a C and is formed along the outer periphery of the top face of the pump chamber 24, and a concave groove 34 formed onto the cap 26 opposite the concave groove 32.

Also defined in the top face of the pump chamber 24 is a circular and concave supplemental space 36 for fluid movement, which defines spacing allowing the supplemental vanes 22d of the impeller 22 to rotate. A partition wall 38 whose length is in the form of a ring, is formed between the supplemental space 36 and the concave groove 32. In addition, the supplemental space 36 communicates with the end of the flow channel 30 through a concave-shaped fluid flow path 40, which is formed by cutting part of the partition wall 38.

Figure 1A:
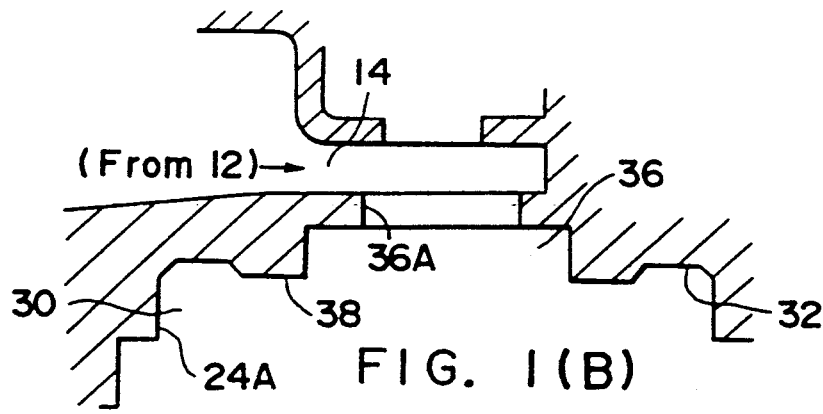
FIG. 1(A) is a cross-sectional view showing the structure adjacent to a pump chamber formed in a pump according to one embodiment of the present invention.
Figure 1B:
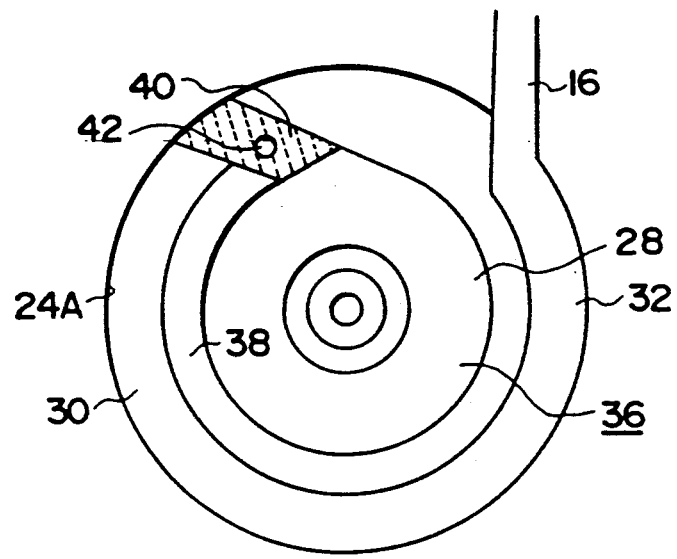
FIG. 1(B) is a bottom view of the structure shown in FIG. 1(A)
Figure 1C:
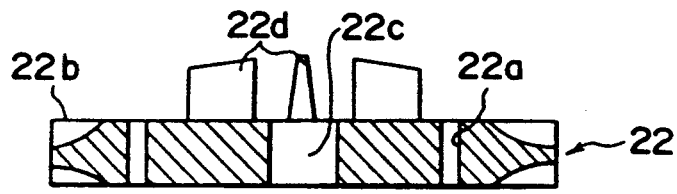
FIG. 1(C) is a cross-sectional view showing an impeller and taken along the axial center thereof.
Figure 1D:
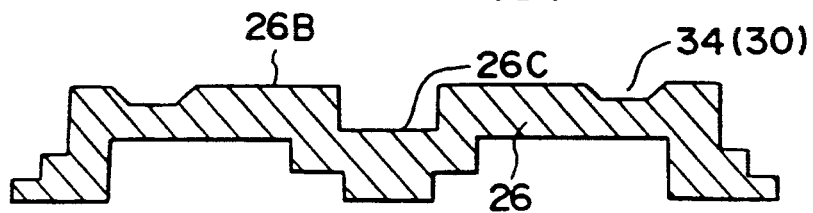
FIG. 1(D) is a cross-sectional view showing a cap corresponding to the structure depicted in FIG. 1(A)

As shown in FIG. 1(D), the cap 26 has a bottom face 26B for the pump chamber, which is formed in the inner side surrounded by the concave groove 34. Also formed in the center of the bottom face 26B of the pump chamber 24 is a groove 26C for holding the distal end of the rotary shaft 20 of the motor.

As also depicted in FIG. 4, the spaces between the impeller 22 and the top face of the partition wall 38 and that between the bottom face 26B of the pump chamber and the impeller 22 are narrow. The grooves 22b formed in the impeller 22 are such that they are rotated and driven along the flow channel 30 within the pump chamber 24.

Incidentally, as illustrated in FIG. 4, a hole 36A, through which the rotary shaft 20 of the motor extends, is formed in the central portion of the supplemental space 36. However, a spacing is defined between the inner peripheral wall of the hole 36A and the rotary shaft 20 of the motor and is used as a passage through which washer fluid from the inlet 14 is delivered to the supplemental space 36.

The features of the present invention reside in that the washer fluid delivered to the intake hole 12 is supplied to the supplemental space 36 in the pump chamber 24 via an inlet 14 and the pressure exerted on the washer fluid is increased owing to the rotation of the supplemental vanes of the impeller 22 so as to be forced into one end of the flow channel 30 via the fluid flow path 40.

The washer fluid, which has been forced into the flow channel 30, is gradually subjected to an increase in pressure together with the rotation of the impeller 22 owing to the grooves 22b formed in the outer periphery of the impeller 22. The washer fluid is then discharged under full pressure from an outlet 16 provided at the other end of the flow channel 30.

It is thus possible to force washer fluid into the flow channel 30 formed along a locus face developed by the rotation of the grooves 22b in the impeller 22 and hence to prevent air locks occurring, even when residual air exists in the pump chamber 24.

One other feature of the present invention resides in that an air vent 42 for providing a discharge of air is formed in the supplemental space 36, the fluid flow path 40 or the flow channel 30. In the present embodiment, the air vent 42 is provided so it communicates between the end of the flow channel 30 and the inlet 14.

Thus, the forcing of washer fluid into the flow channel 30, the discharge of the residual air from the pump chamber 24 or the like can be effected simultaneously, so that any problem due to air is solved rapidly and effectively.

As indicated obliquely by the broken line in FIG. 1(B) in particular, it is preferable that the air vent 42 is formed in the fluid flow path 40 and in a portion adjacent to the fluid flow path 40 connected to the flow channel 30. As shown in FIG. 4, the air vent 42 is a through-hole whose free end makes an opening on the upstream side of the hole 36A formed in the inlet 14 and whose axis is defined as a straight line.

The diameter of the air vent 42 should be 2 mm or more to effectively discharge air from the air vent 42. When the air vent 42 diameter is large, the washer fluid from the inlet 14 is introduced into the pump chamber 24 as an alternative to the use of the hole 36A, thereby overcoming a possible problem.

Figure 6A:
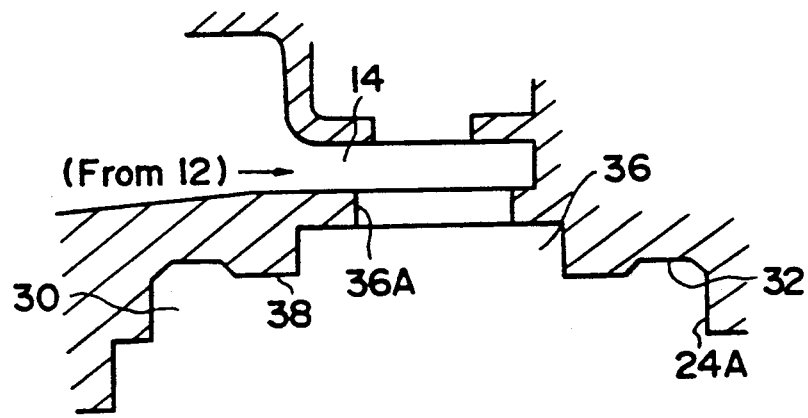
FIG. 6(A) is a cross-sectional view of the structure with fluid flow shown therein, which is similar to that illustrated in FIG. 1(A)
Figure 6B:
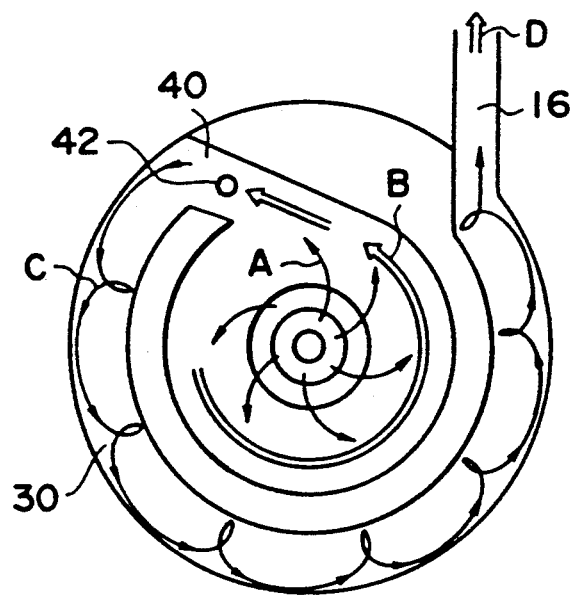
FIG. 6(B) is a cross-sectional view of the structure with fluid flow shown therein, which is similar to that depicted in FIG. 1(B)
Figure 7:
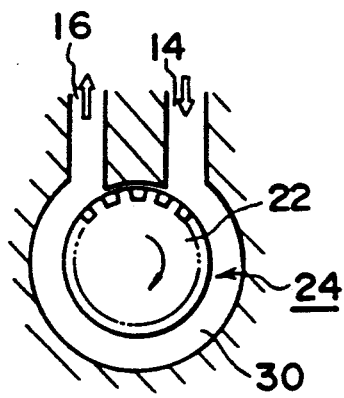
FIG. 7 is a plan view in section showing a conventional pump chamber.
Figure 8:
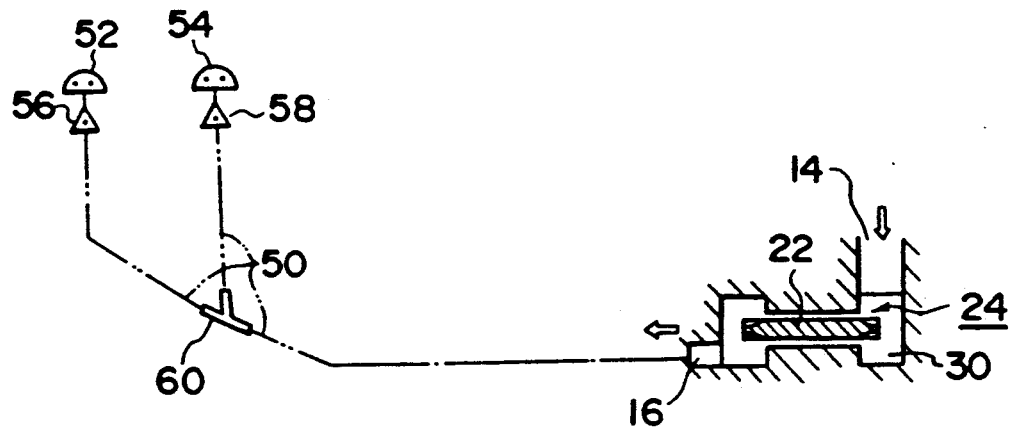
FIG. 8 is a schematic view for describing the piping arrangement of a conventional pump chamber.

FIGS. 6(A) and 6(B) show the washer fluid flow from the input of the fluid into the inlet to the discharge of the same from the outlet 16.

In other words, when the unillustrated empty washer fluid supply tank is refilled, but the pump chamber 24 and piping arrangement are dry, the washer fluid is introduced from the central portion of the pump chamber 24 into the supplemental space 36 thereof via the intake hole 12 and the inlet 14 as shown in FIG. 6(A) (as indicated by the arrow A). When the washer fluid is introduced into the supplemental space 36 as referred to above, some of the residual air which exists inside the pump chamber 24 is discharged on the side of the inlet 14 via the air vent 42 (as indicated by the arrow B), so that the washer fluid with air contained therein can surround the supplemental vanes 22d of the impeller 22 or enter part of the flow channel 30 in which air is trapped.

When the washer switch is operated to rotatably drive the impeller 22 in this state, the flow channel 30 is fully filled with the washer fluid within the supplemental space 36 via the fluid flow path 40 in accordance with the rotary motion of the supplemental vanes 22d which are driven correspondingly, as shown in FIG. 6(B) (as indicated by the arrow C).

The washer fluid with which the flow channel 30 is filled is gradually pressurized by rotatably driving the impeller 22 so as to be delivered at full pressure from the outlet 16 provided on the side of the other end of the flow channel 30 (as indicated by the arrow D).

According to the present invention, the residual air, which exists within the pump chamber 24 and the piping arrangement, can easily be extruded from the nozzles 52, 54 with fully pressurized washer fluid in the above-described manner, without risk of the air lock problems which can occur in the conventional example.

Incidentally, the present invention is not necessarily limited to the above-described embodiment and many changes and modifications can be made thereto without departing from the spirit and scope of the invention as set forth herein.

In the above-described embodiment, a description has been made in the case where, for example, the four supplemental vanes 22d are mounted on the impeller 22 symmetrically with respect to the center of rotation of the shaft. However, the present invention is not necessarily limited to this embodiment. For example, the supplemental vanes 22d may also be designed in an arbitrary form and the number of the supplemental vanes 22d may also be increased or decreased as needed.

A description has been made of the Westco rotary pump by way of an illustrative example in the above-described embodiment. However, needless to say, pumps other than the Westco rotary pump can be adapted as needed.

What is claimed is:

1. A windscreen washer pump having an inlet and an outlet suitable for use with washer fluid, wherein said washer fluid supplied from said inlet is forced under pressure from said outlet, comprising:
   a pump chamber;
   an impeller provided within said pump chamber;
   a supplemental chamber disposed between said impeller and said inlet;
   a flow channel disposed in said pump chamber and partitioned from said supplemental chamber by a partition wall;
   a motor for rotatably driving said impeller;
   a plurality of supplemental vanes provided within said supplemental chamber and responsive to the driving force of said motor so as to be rotated together with said impeller, said plurality of supplemental vanes serving to force-feed under pressure said washer fluid supplied from said inlet to said impeller thus ensuring delivery of said washer fluid from said impeller when air is present in the lines; and
   an air vent which provides communication between said inlet and said pump chamber for expelling air from said pump chamber to said inlet.

2. A windscreen washer pump according to claim 1, wherein said partition wall is provided around said impeller and a cut-away portion is formed on part of said partition wall so as to be a forced-fluid path communicating with said flow channel.

3. A windscreen washer pump according to claim 2, wherein said air vent is formed to communicate with one of said supplemental chamber, said flow channel and said forced-fluid path.

4. A windscreen washer pump according to claim 1, wherein said plurality of supplemental vanes are disposed coaxially with said impeller.

5. A windscreen washer pump according to claim 4, wherein said plurality of supplemental vanes are fixedly secured integrally with said impeller.

6. A windscreen washer pump according to claim 5, wherein said plurality of supplemental vanes are a plurality of plate members disposed in a radial direction of said impeller.

7. A windscreen washer pump according to claim 1, wherein said plurality of supplemental vanes are disposed around a rotary shaft of said motor secured to said impeller.

8. A windscreen washer pump according to claim 1, wherein a hole for causing said washer fluid delivered from said inlet to pass through the outer periphery of the rotary shaft of said motor along the rotary shaft thereof is formed in a housing, and said plurality of supplemental vanes radially disposed around the rotary shaft of said motor is provided in an opposing relationship to the flow of said washer fluid from said hole and also serve to forcibly feed under pressure said washer fluid in the radial direction so as to be delivered to said flow channel.

9. A washer pump for use with washer fluid, which has an inlet, an outlet and a pump chamber disposed therebetween, and is designed to forcibly pressure feed said washer fluid through said pump chamber to a vehicle windscreen, said washer pump comprising:
   an impeller formed with a plurality of concave grooves;
   a motor for driving said impeller;
   a plurality of supplemental vanes integrally projecting from said impeller and disposed around a drive shaft of said motor along a radial direction of said impeller, said plurality of supplemental vanes serving to forcibly pressure feed said washer fluid with air included therein to the outer periphery of said impeller; and
   an air vent which provides communication between said inlet and said pump chamber for expelling air in said pump chamber to said inlet.

10. A washer pump according to claim 9, wherein said impeller is provided within said pump chamber and said plurality of supplemental vanes are disposed within a supplemental chamber which is in communication with said pump chamber.

11. A washer pump according to claim 10, wherein said pump chamber and said supplemental chamber are partitioned by a ring-shape partition wall.

12. A washer pump according to claim 11, wherein said pump chamber is formed within a housing in a ring form in association with the outer periphery of said impeller, and said supplemental chamber is provided inwardly of said pump chamber.

13. A washer pump according to claim 11, wherein said partition wall is partially cut to form a forced-fluid path communicating with said supplemental chamber and said pump chamber.

14. A washer pump according to claim 13, wherein said air vent has one end in communication with any one of said pump chamber, said forced-fluid path and said supplemental chamber.

15. A washer pump according to claim 12, wherein a hole for supplying said washer fluid to said supplemental chamber along its axial direction is formed in said housing.

16. A washer pump for use with washer fluid, which is designed to forcibly feed under pressure said washer fluid to a vehicle windscreen, said pump comprising:

a housing having an inlet, an outlet and a pump chamber disposed therebetween;

an impeller rotatably supported in said housing;

a motor provided in said housing for driving said impeller;

a plurality of supplemental vanes disposed coaxially with said impeller and driven by said motor;

a forced-fluid path for introducing said washer fluid pressurized with said plurality of supplemental vanes into said impeller; and an air vent provided to communicate with said inlet of said housing with said pump chamber and formed in association with said impeller, said forced-fluid path, and said plurality of supplemental vanes for expelling water and air to said inlet.

17. A washer pump according to claim 16, wherein a hole for feeding said washer fluid to said plurality of supplemental vanes is formed between the inner periphery of said hole and the outer periphery of a motor shaft and serves to supply said washer fluid to said plurality of supplemental vanes along the axial direction.

* * * * *